United States Patent [19]

Saegusa et al.

[11] Patent Number: 5,086,451
[45] Date of Patent: Feb. 4, 1992

[54] METHOD FOR CONTROLLING A PLURALITY OF STATIONARY APPARATUSES IN A CORDLESS TELEPHONE SYSTEM

[75] Inventors: Noboru Saegusa; Yukihiro Shimura, both of Tokyo; Hideki Toyama, Kanagawa; Yuji Ohta, Osaka; Shoji Fuse; Koji Ono, both of Tokyo all of Japan

[73] Assignees: NEC Corporation; Nippon Telegraph & Telephone Corporation, both of Tokyo; K.K. Toshiba, Kanagawa, all of Japan

[21] Appl. No.: 380,359

[22] Filed: Jul. 17, 1989

[30] Foreign Application Priority Data

Jul. 15, 1988 [JP] Japan ................. 63-175212

[51] Int. Cl.⁵ .................................. H04M 11/00
[52] U.S. Cl. ............................. 379/58; 379/63
[58] Field of Search .................... 379/58–63, 379/2, 27, 29, 32, 34; 340/825.06

[56] References Cited

U.S. PATENT DOCUMENTS

| | | | |
|---|---|---|---|
| 4,656,653 | 4/1987 | Oda | 379/61 |
| 4,807,259 | 2/1989 | Yamanaka et al. | 340/825.06 |
| 4,856,047 | 8/1989 | Saunders | 379/57 |
| 4,939,785 | 7/1990 | Murata et al. | 379/61 |

FOREIGN PATENT DOCUMENTS 0081821 4/1987 Japan ................. 379/58

*Primary Examiner*—James L. Dwyer
*Assistant Examiner*—Dwayne D. Bost
*Attorney, Agent, or Firm*—Sughrue, Mion, Zinn, Macpeak & Seas

[57] ABSTRACT

Disclosed is a radio channel control method for a system including a main apparatus connected to a telephone line and having a channel control function, a plurality of stationary apparatuses connected to the main apparatus and each having a radio transmitter/receiver, and a portable telephone capable of communicating with the stationary apparatuses through a radio channel. In this method, the main apparatus designates each stationary apparatus in a main or sub state to control communication with the portable telephone and monitors a state signal including information of the main or sub state transmitted from each stationary apparatus. When the state signal from a given stationary apparatus does not coincide with a state of the given stationary apparatus designated by the main apparatus, the main apparatus transmits a state designation signal to the given stationary apparatus to coincide with the state designated by the main apparatus.

5 Claims, 3 Drawing Sheets

METHOD FOR CONTROLLING A PLURALITY OF STATIONARY APPARATUSES IN A CORDLESS TELEPHONE SYSTEM

BACKGROUND OF THE INVENTION

The present invention relates to a radio channel control method for connecting a plurality of stationary apparatuses and a plurality of portable mobile telephones through radio channels and, more particularly, to a radio channel control method in a mobile communication apparatus such as a cordless telephone used in a relatively small area.

FIG. 1 is a block diagram showing an arrangement of a cordless telephone set. In FIG. 1, reference numeral 1 denotes a main apparatus connected to a telephone line and having a line control function; $10_l$ to $10_n$, a plurality of stationary apparatuses each having a radio receiver/transmitter; and $20_l$ to $20_n$, portable telephones. The main apparatus 1 and the stationary apparatuses $10_l$ to $10_n$ are couple $L_l$ to $L_n$. The portable telephones $20_l$ to $20_n$ and the stationary apparatuses $10_l$ to $10_n$ are present in a single area A and use a single frequency as a control radio channel. For this reason, the main apparatus 1 is set in a main state in which only a stationary apparatus designated by a control signal is controlled through a radio channel. Therefore, the remaining stationary apparatuses are set in a sub state in which they wait for designation by the control signal.

In the conventional radio channel control method, however, when a control signal cannot be received even once due to an error in a wire line between the main apparatus 1 and the stationary apparatus, all the stationary apparatuses are set in the sub state, and the radio channel cannot be connected. This drawback will be exemplified below.

FIG. 2 is a chart showing a conventional radio channel control method. For the sake of simplicity, an arrangement comprises the main apparatus, first and second stationary apparatuses, and first and second portable telephones. Assume that the first stationary apparatus is designated in the main state by the main apparatus.

In FIG. 2, the first portable telephone transmits a call signal $S_{21}$ to the first stationary apparatus in response to a call operation by a user. Upon reception of the call signal $S_{21}$, the first stationary apparatus designated in the main state transmits a call signal $S_{22}$ to the main apparatus, and transmits a call response signal $S_{23}$ including communication channel information to the first portable telephone. Thereafter, the first stationary apparatus is switched to the sub state by itself. Subsequently, upon reception of the call response signal $S_{23}$, the first portable telephone is switched to a communication channel, and transmits a channel switching signal $S_{24}$ to the first stationary apparatus. When the first stationary apparatus receives the channel switching signal $s_{24}$, it transmits an AF (Audio Frequency)-ON signal $S_{25}$ to the first portable telephone, and transmits a connection end signal $S_{26}$ to the main apparatus, thus enabling communication with the first portable telephone. Meanwhile, when the main apparatus receives the call signal $S_{22}$, it transmits a state designation signal $S_{27}$ to the second stationary apparatus to switch the second stationary apparatus to the main state. Upon reception of the connection end signal $S_{26}$ from the first stationary apparatus, the main apparatus connects the first portable telephone and the telephone line.

However, when a given error occurs in the wire line and the second stationary apparatus cannot receive the state designation signal from the main apparatus, the second stationary apparatus is kept in the sub state. Therefore, in this state, even if a user of the second portable telephone transmits a call signal $S_{28}$, the radio channel cannot be connected since the second stationary apparatus is kept in the sub state.

As described above, in the conventional method, since the main apparatus does not confirm the states of the stationary apparatuses, if a given error occurs in the wire line and the state designation signal cannot be received even once, the radio channel cannot be connected.

SUMMARY OF THE INVENTION

It is therefore a principal object of the present invention to provide a radio channel control method in which a main apparatus confirms states of stationary apparatuses, so that even if an error occurs in a wire line, a radio channel can be connected.

In order to achieve the above object, according to an aspect of the present invention, there is provided a radio channel control method for a system comprising a main apparatus connected to a telephone line and having a line control function, a plurality of stationary apparatuses connected to the main apparatus and each having a radio transmitter/receiver, and a portable telephone capable of communicating with the stationary apparatuses through a radio channel, wherein the main apparatus designates each of the stationary apparatuses in a main or sub state to control communication with the portable telephone, monitors a state signal including information of the first or second state transmitted from each of the stationary apparatuses, and when the state signal from a given stationary apparatus does not coincide with a state of the given stationary apparatus designated by the main apparatus, transmits a state designation signal to the given stationary apparatus to coincide with the state designated by the main apparatus.

DESCRIPTION OF THE PREFERRED EMBODIMENT

Figure 1:
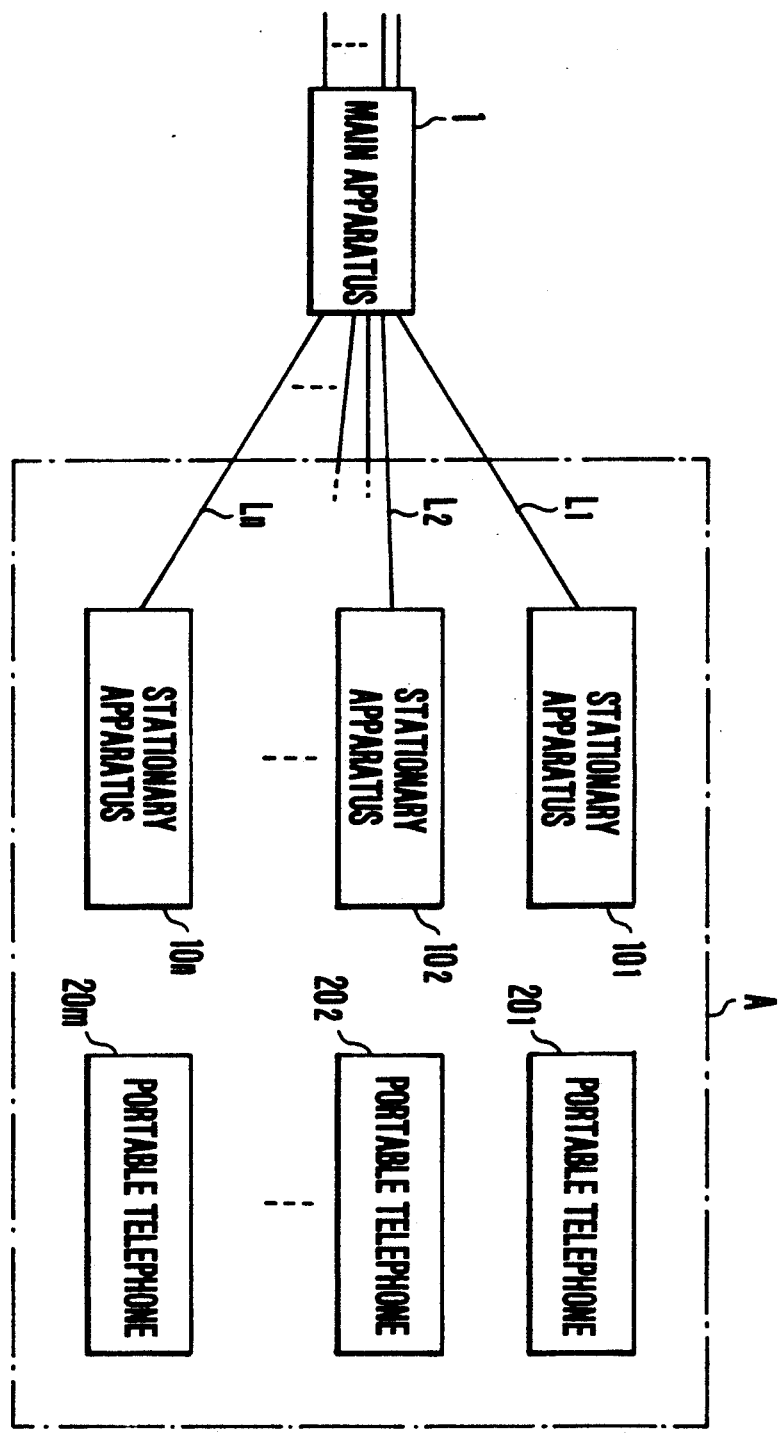
FIG. 1 is a block diagram showing an arrangement of a cordless telephone set.
Figure 2:
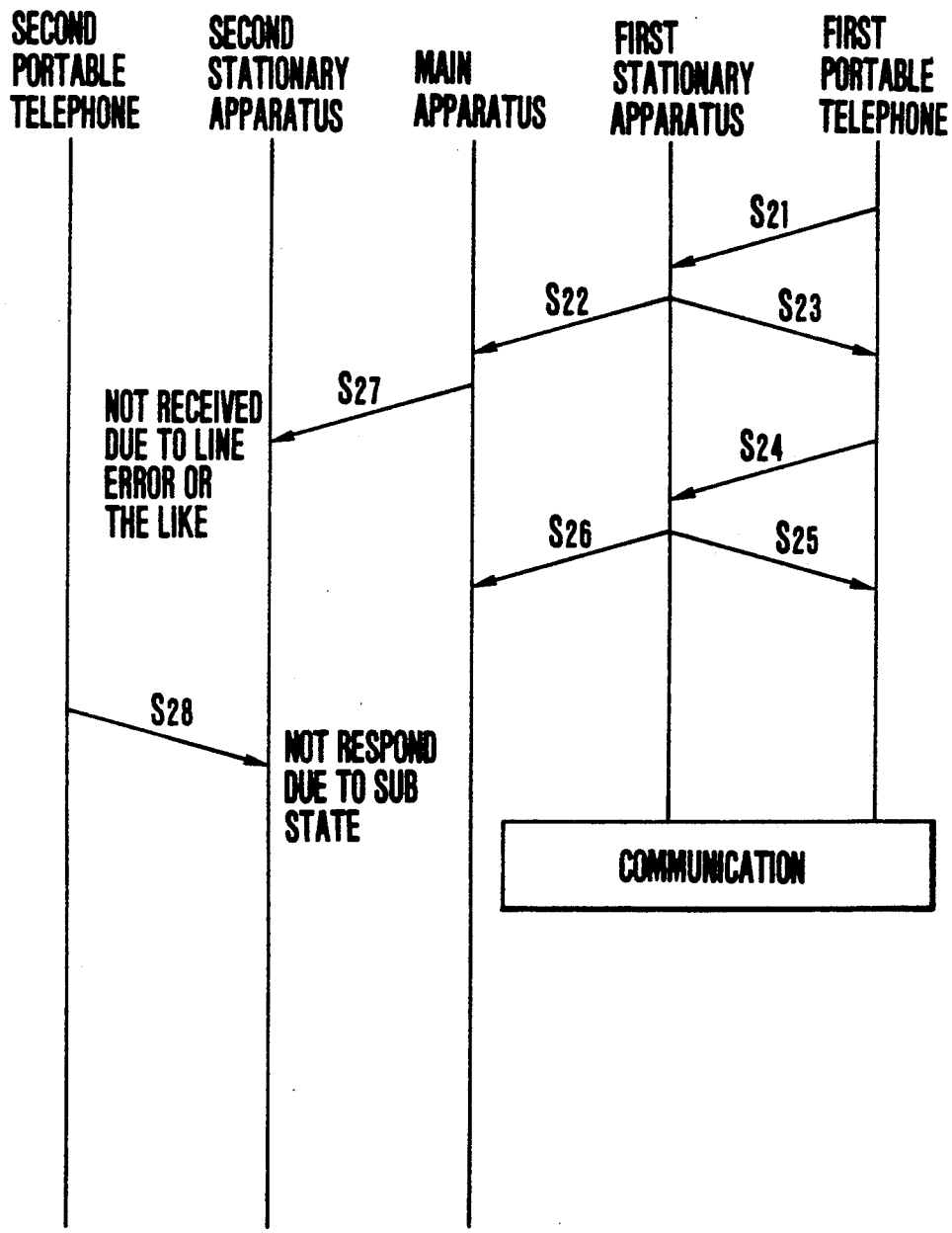
FIG. 2 is a chart showing a conventional radio channel control method.
Figure 3:
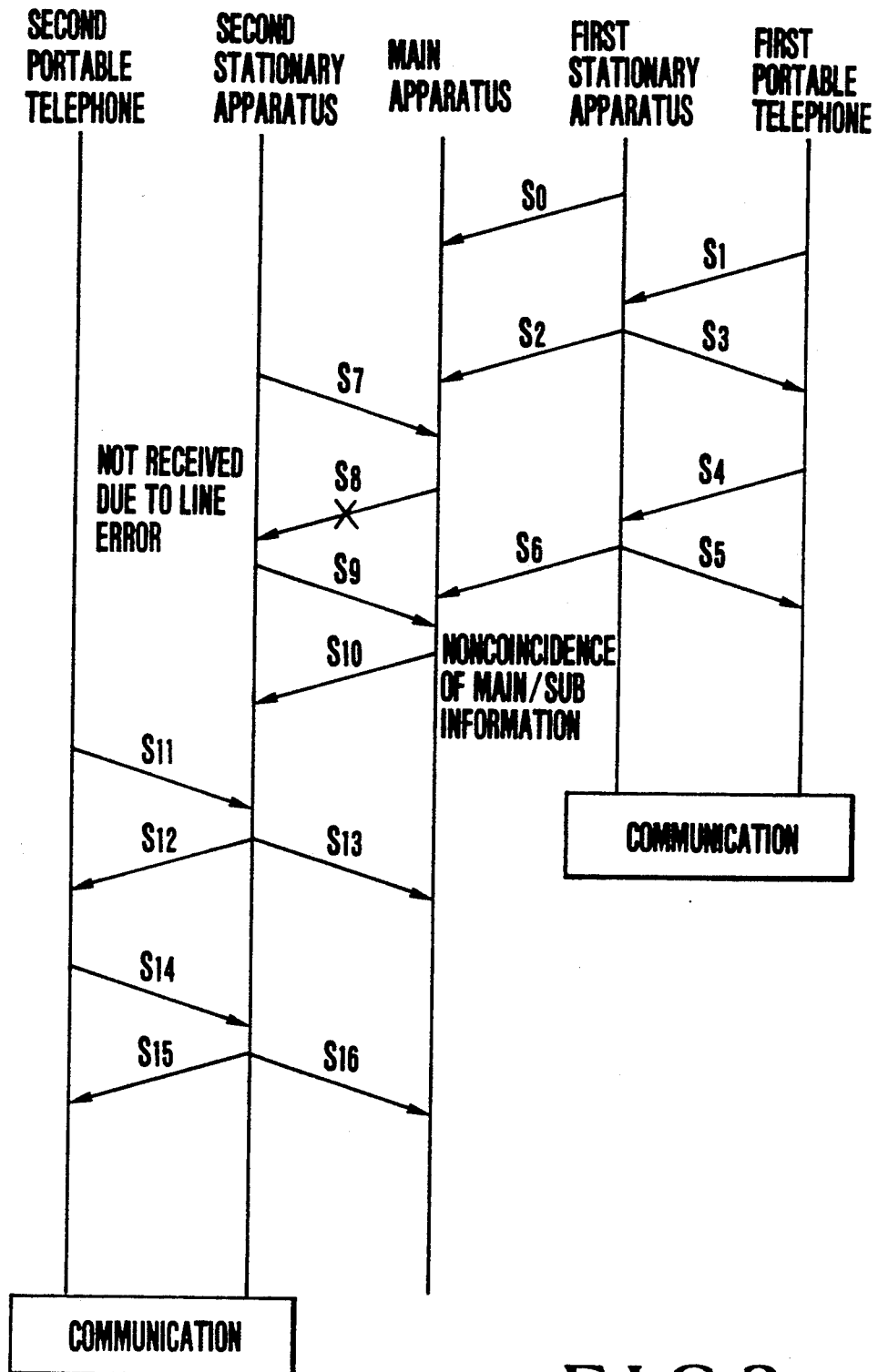
FIG. 3 is a chart showing a radio channel control method according to the present invention.

FIG. 3 is a chart showing a radio channel control method according to the present invention. Assume that this embodiment comprises a main apparatus, first and second stationary apparatuses, and first and second portable telephones for the sake of simplicity as in FIG. 2. The first stationary apparatus is set in a main state, and the second stationary apparatus is set in a sub state. The two stationary apparatuses periodically send a state signal including main/sub information to the main apparatus.

The first portable telephone sends a call signal $S_l$ to the first stationary apparatus in response to a call operation by a user. Upon reception of the call signal $S_l$, the first stationary apparatus which is designated in the main state by the main apparatus transmits a call signal $S_2$ to the main apparatus, and transmits a call response signal $S_3$ including communication channel information to the first portable telephone. Thereafter, the first stationary apparatus is switched to the sub state by itself. Upon reception of the call response signal S₃, the first portable telephone is switched to a communication channel, and transmits a channel switching signal S₄ to the first stationary apparatus. Upon reception of the channel switching signal S₄, the first stationary apparatus transmits an AF-ON signal S₅ to the first portable telephone, and transmits a connection end signal S₆ to the main apparatus.

Meanwhile, when the main apparatus receives the call signal S₂, it changes stored main/sub information of the first stationary apparatus from the main state to the sub state, and changes the stored information of the second stationary apparatus from the sub state to the main state on the basis of a state signal S₀ supplied from the first stationary apparatus. In this state, the main apparatus compares the stored main/sub information with a state signal S₇ transmitted from the second stationary apparatus. As a result, when two pieces of information do not coincide with each other, the main apparatus transmits a state designation signal S₈ to the second stationary apparatus to switch it to the main state.

When an error occurs in the wire line connecting the main apparatus and the second stationary apparatus, the second stationary apparatus cannot receive the state designation signal S₈ from the main apparatus. However, since the second stationary apparatus periodically transmits the state signal including main/sub information, it can transmit the next state signal S₉ to cause the main apparatus to detect again that the two pieces of information do not coincide with each other. Thus, the second stationary apparatus can receive the next state designation signal S₁₀ from the main apparatus and can be switched to the main state.

Thereafter, when the second stationary apparatus receives a call signal S₁₁ from the second portable telephone, it transmits a call signal S₁₂ to the second portable telephone, and also transmits a call signal S₁₃ to the main apparatus. Upon reception of a channel switching signal S₁₄ from the second portable telephone, the second stationary apparatus transmits an AF-ON signal S₁₅ to the second portable telephone, and transmits a connection end signal S₁₆ to the main apparatus, thus enabling communication with the second portable telephone.

In the description of the embodiment, the number of stationary apparatuses is two. When three or more stationary apparatuses are arranged, one of the stationary apparatuses other than the stationary apparatus which has been changed to the sub state can be selected and can be switched to the main state by the state designation signal.

According to the present invention, the stationary apparatus periodically transmits a state signal including main/sub information. Thus, even if the main apparatus cannot transmit a state designation signal to the stationary apparatus due to an error in a wire line, the main apparatus can transmit the state designation signal again in response to the next state signal from the stationary apparatus. In this manner, the main apparatus can reliably designate the main/sub state of the stationary apparatus, and a communication disable state caused by an error in a wire line can be prevented.

When a state signal cannot be received from a stationary apparatus within a predetermined period of time or when main/sub information of a state signal varies in every reception, the main apparatus can determine that the corresponding stationary apparatus is abnormal, thus providing great practical advantages.

What is claimed is:

1. A control method for a system having a main apparatus connected to a telephone line and having a line control function, a plurality of stationary apparatuses connected to said main apparatus and each having a radio transmitter/receiver, and a portable telephone capable of communicating with said stationary apparatuses through a radio channel, said method comprising the steps of:

designating, using said main apparatus, each of said stationary apparatuses in a main or sub state to control communication with said portable telephone;

monitoring a state signal including information of the main or sub state transmitted from each of said stationary apparatuses; and when the state signal from a given stationary apparatus does not coincide with a state of the given stationary apparatus designated by said main apparatus, transmitting a state designation signal to the given stationary apparatus to coincide with the state designated by said main apparatus.

2. A method according to claim 1, wherein the main state is a state in which one of said plurality of stationary stations is connected to said portable telephone through the radio channel, and the sub state is a state which can be switched to the main state upon reception of a state designation signal including the main state information from the main apparatus and which has been kept in the sub state until reception of said state designation signal without transmitting and receiving signals to and from the portable mobile telephone through the radio channel.

3. A method according to claim 1, wherein each of said stationary apparatuses periodically sends the state signal to said main apparatus during a communication standby state.

4. A method of controlling the states of first and second stationary apparatuses coupled to a main apparatus, said method comprising the steps of:

storing at said main apparatus the states of said first and second stationary apparatuses;

periodically transmitting to said main apparatus from either one of said first and second stationary apparatuses which is in a waiting state a state signal indicating said waiting state;

comparing at said main apparatus states indicated by said state signal and stored at said main apparatus;

transmitting a state designate signal from said main apparatus to said first or second stationary apparatus in said waiting state if the states compared are different with each other; and setting said first or second stationary apparatus in said waiting state to a state designated by said state designate signal.

5. In a combination of a main apparatus and a plurality of stationary apparatuses coupled to said main apparatus, said main apparatus comprising:
means for storing the states of said plurality of stationary apparatuses;
means for comparing the stored state of one of said plurality of stationary apparatuses and a state indicated by a state signal; and means for transmitting a state designate signal if said comparing means indicates that the compared states are different with each other, each of said plurality of stationary apparatuses comprising;

means for periodically transmitting to said main apparatus said state signal indicating that the associated stationary apparatus is in a waiting state; and means for setting said associated stationary apparatus to a state designated by said state designate signal.

* * * * *